US011452936B2

(12) United States Patent
Katoh

(10) Patent No.: US 11,452,936 B2
(45) Date of Patent: Sep. 27, 2022

(54) INFORMATION PROCESSING APPARATUS

(71) Applicant: Sony Interactive Entertainment Inc., Tokyo (JP)

(72) Inventor: Hiroshi Katoh, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 125 days.

(21) Appl. No.: 16/186,760

(22) Filed: Nov. 12, 2018

(65) Prior Publication Data
US 2019/0151753 A1 May 23, 2019

(30) Foreign Application Priority Data

Nov. 20, 2017 (JP) .............................. JP2017-222797

(51) Int. Cl.
A63F 13/22 (2014.01)
A63F 13/40 (2014.01)
A63F 13/69 (2014.01)
A63F 13/73 (2014.01)
A63F 13/75 (2014.01)

(52) U.S. Cl.
CPC .............. A63F 13/22 (2014.09); A63F 13/40 (2014.09); A63F 13/69 (2014.09); A63F 13/73 (2014.09); A63F 13/75 (2014.09); A63F 2300/1018 (2013.01); A63F 2300/1025 (2013.01)

(58) Field of Classification Search
CPC ................................. A63F 13/22; A63F 13/73
See application file for complete search history.

(56) References Cited

U.S. PATENT DOCUMENTS 5,551,701 A * 9/1996 Bouton ................... A63F 13/06 463/36
5,610,631 A * 3/1997 Bouton ................... A63F 13/06 345/161
2011/0118022 A1* 5/2011 Aronzon ................. A63F 13/42 463/37

(Continued)

FOREIGN PATENT DOCUMENTS

JP 08-022370 A 1/1996
JP 2001-034411 A 2/2001

(Continued)

OTHER PUBLICATIONS

What Happens When, "How to FIX the see through Hand on the Nintendo Wii U Menu," available at https://www.youtube.com/watch?v=qLjPDCG-GfA, published Sep. 5, 2017 (Year: 2017).*

(Continued)

Primary Examiner — Jay Trent Liddle
(74) Attorney, Agent, or Firm — Katten Muchin Rosenman LLP

(57) ABSTRACT

Disclosed herein is an information processing apparatus which is connected to a manipulating device, the apparatus including: a manipulation receiving unit configured to accept from the manipulating device specific manipulation for instructing to execute a specific function independent of an application program, and a limiting unit configured to limit the acceptance of the specific manipulation in the case where an alternative section to instruct the execution of the specific function apart from the specific manipulation is available.

4 Claims, 3 Drawing Sheets

(56) References Cited

U.S. PATENT DOCUMENTS

| | | | | |
|---|---|---|---|---|
| 2012/0295707 A1* | 11/2012 | Nonaka | ............... | A63F 13/42 |
| | | | | 463/31 |
| 2013/0090166 A1* | 4/2013 | Mao | .................. | G06F 3/0346 |
| | | | | 463/31 |
| 2014/0038696 A1* | 2/2014 | Fujimoto | ............ | A63F 13/12 |
| | | | | 463/24 |
| 2014/0121025 A1* | 5/2014 | Liu | .................... | A63F 13/12 |
| | | | | 463/42 |
| 2017/0036104 A1* | 2/2017 | Aronzon | ............. | A63F 13/42 |

FOREIGN PATENT DOCUMENTS

| | | | |
|---|---|---|---|
| JP | 2008-011050 A | 1/2008 | |
| JP | 2010-283424 A | 12/2010 | |
| JP | 2011-227628 A | 11/2011 | |
| JP | 2016-220119 A | 12/2016 | |

OTHER PUBLICATIONS

Japanese Notice of Allowance dated Apr. 28, 2020, for the Corresponding Japanese Patent Application No. 2017-222797.
Japanese Office Action dated Oct. 15, 2019 for the Corresponding Japanese Patent Application No. 2017-222797.

* cited by examiner

INFORMATION PROCESSING APPARATUS

BACKGROUND

The present disclosure relates to an information processing apparatus, a controlling method, and a program, which are so designed as to accept from the user the entry for operation corresponding to a specific function.

There exists an information processing apparatus capable executing a plurality of application programs. It occasionally accepts from the user the entry for operation to execute a specific function which is independent of the application program being executed. Such a specific function includes, for example, the execution of the system program (such as operating system) which is independent of the application program. It also includes the function common to various application programs. This function may be part of the active application which is used, for example, to bring back the screen image by one step. For this function to be executed the user depresses a specific physical button or handles a specific object that appears at a predetermined position in the display region.

SUMMARY

In order to enter the operation relating to the specific function mentioned above, it is necessary to activate the specific function irrespective of the application program being executed. However, there may be an instance in which it is desirable to deactivate the specific function. Such an instance occurs when a little child plays computer games. In this instance it may be desirable to deactivate the function to terminate the application program or the function to switch the application program to another one. Unfortunately, the information processing apparatus such as game machine is usually designed such that it is not able to deactivate the function easily because deactivation will cause malfunction.

The present disclosure was completed in view of the foregoing. It is desirable to provide an information processing apparatus, a controlling method, and a program, which are so designed as to easily deactivate the entry of operation to accept the function independent of the application program.

According to an embodiment of the present disclosure, there is provided an information processing apparatus which is connected to a manipulating device, the apparatus including a manipulation receiving unit configured to accept from the manipulating device specific manipulation for instructing to execute a specific function independent of an application program, and a limiting unit configured to limit the acceptance of the specific manipulation in the case where an alternative section to instruct the execution of the specific function apart from the specific manipulation is available.

According to another embodiment of the present disclosure, there is provided a method for controlling an information processing apparatus which is connected to a manipulating device, the method including accepting from the manipulating device specific manipulation for instructing to execute a specific function independent of an application program, and limiting the acceptance of the specific manipulation in the case where an alternative section to instruct the execution of the specific function apart from the specific manipulation is available.

According to another embodiment of the present disclosure, there is provided a program for an information processing apparatus connected to a manipulating device, the program including by a manipulation receiving unit, accepting from the manipulating device specific manipulation for instructing to execute a specific function independent of an application program, and by a limiting unit, limiting the acceptance of the specific manipulation in the case where an alternative section to instruct the execution of the specific function apart from the specific manipulation is available. Incidentally, this program may be supplied in the form of data stored in a computer-readable non-temporary information storage medium.

DETAILED DESCRIPTION OF THE PREFERRED EMBODIMENTS

The following is a detailed description, with reference to the accompanying drawings, of embodiments of the present disclosure.

First Embodiment

Figure 1:
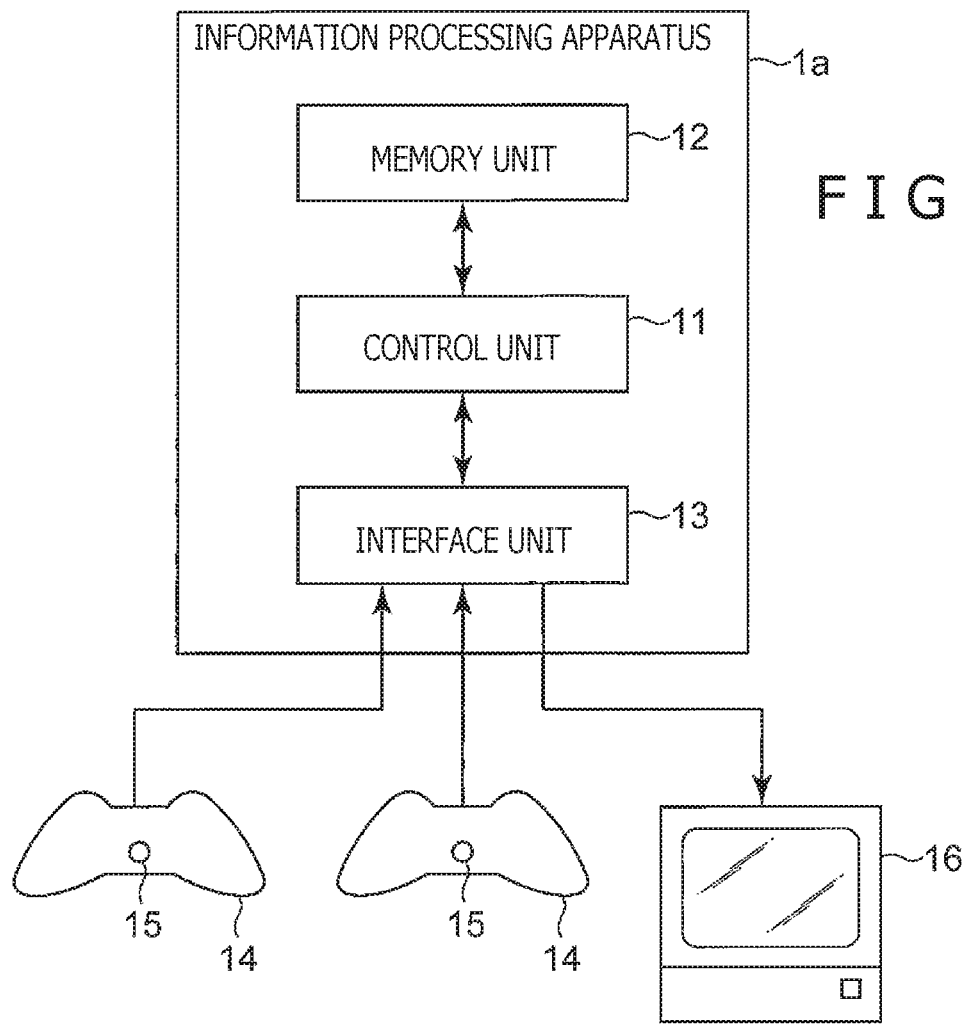
FIG. 1 is a diagram depicting a construction of an information processing apparatus pertaining to a first embodiment of the present disclosure.

The first embodiment of the present disclosure covers an information processing apparatus 1*a*, which is a desktop game machine. As depicted in FIG. 1, it includes a control unit 11, a memory unit 12, and an interface unit 13. Moreover, the information processing apparatus 1*a* is connected to a manipulating device 14 and a display unit 16. According to this embodiment, it is assumed that the information processing apparatus 1*a* may have more than one set of the manipulating device 14 connected thereto.

The control unit 11 contains at least one processor so that it executes various kinds of information processing according to the programs stored in the memory unit 12. A detailed description will be given below of the typical example of the processing to be executed by the control unit 11.

The memory unit 12 contains a memory device and others so that it stores the program to be executed by the control unit 11. This program is stored in a computer-readable non-temporary storage medium to be offered to the user and duplicated in this memory unit 12. In addition, the memory unit 12 functions also as the work memory for the control unit 11.

The interface unit 13 includes at least one of serial interface (such as USB (Universal Serial Bus)) and wireless communication interface (such as Bluetooth (registered trademark)). The interface unit 13 permits the information processing apparatus 1*a* to be connected to the manipulating device 14 and the display unit 16. In particular, the interface unit 13 in this embodiment receives from the manipulating device 14 the signal indicating what the user should do for the manipulating device 14 and transmits to the display unit 16 the video signal indicating what to display on the screen of the display unit 16.

The manipulating device 14 has manipulating parts (such as buttons and levers) arranged on the enclosure surface, so that it accepts the user's input for manipulation through such manipulating parts and transmits what it has received to the information processing apparatus 1*a*. In this embodiment, the manipulating device 14 has a special-purpose button 15 (to be mentioned later) arranged on the enclosure surface. The display unit 16 may be a domestic television receiver or a head-mounted display, which causes its screen to display the image of video signals sent from the information processing apparatus 1*a*.

Figure 2:
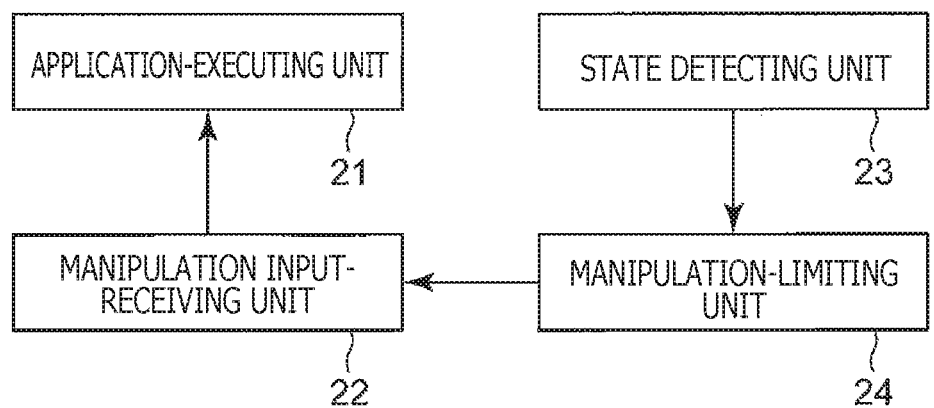
FIG. 2 is a block diagram depicting functions of the information processing apparatus pertaining to the first embodiment of the present disclosure.

The information processing apparatus 1*a* includes an application-executing unit 21, a manipulation input-receiving unit 22, a state detecting unit 23, and a manipulation-limiting unit 24, as depicted in FIG. 2. They function as the control unit 11 executes the program stored in the memory unit 12. This program may be one which is transmitted to the information processing apparatus 1*a* through communication lines (such as the Internet), or may be one which is offered in the form of data stored in an information storage such as optical disc.

The application-executing unit 21 reads out the application program from the memory unit 12 and executes it. According to this embodiment, the application-executing unit 21 is assumed to be able to execute more than one application program. It will be able to execute one application program at one time or execute more than one application program in a certain period of time. In any case, during the execution of the application program, the application-executing unit 21 causes the display unit 16 to display on the screen the image corresponding to at least one of the application programs being executed.

The manipulation input-receiving unit 22 accepts the input which is given to the manipulation device 14 by the user while the application-executing unit 21 is executing the application program. According to this embodiment, it is particularly important to note that the manipulation input-receiving unit 22 accepts the input for the application-executing unit 21 to execute a specific function. The term "specific function" denotes any function which is independent of the kind of the application program being executed by the application-executing unit 21.

To be concrete, the specific function may be a function to be achieved by a system program which is different from the application program being executed by the application-executing unit 21. Examples of the specific function include one to display on the screen the home image or menu image independent of the application program, one to display a list of the application programs being executed, one to end the active application program, and one to terminate/restart the system of the information processing apparatus 1*a*.

The specific function may be a function common to more than one application program. It includes, for example, a process to cancel (or undo) what has been done by the user or a process to return (or back) to the previous image by one step. This function is realized by each application program, and each application program is mounted so that the same function is executed for the same manipulation.

The manipulation to execute the specific function will be referred to as "specific manipulation" hereinafter. The specific manipulation can be done regardless of the application program being executed. To be concrete, the specific manipulation in this embodiment denotes any action to depress the special-purpose button 15 which is attached to the manipulating device 14. With the special-purpose button 15 depressed, the information processing apparatus 1*a* executes the specific function to display the system menu. This permits the user to call out the system menu by operating the special-purpose button 15 and enter any instruction to the information processing apparatus 1*a* at any time while the application program is being executed.

The state detecting unit 23 detects whether or not any alternative section to execute the specific function is available. According to this embodiment, the state detecting unit 23 detects how the manipulating device 14 is currently connected to the information processing apparatus 1*a* when the manipulating device 14 is newly connected to the information processing apparatus 1*a*. To be concrete, the state detecting unit 23 detects that the manipulating device 14 has been newly connected through a USB (or any other cable) to the connector attached to the information processing apparatus 1*a* or that a connection (through wireless communication) has been established with the new manipulating device 14. In the case where another manipulating device 14 having the special-purpose button 15 has already been connected to the information processing apparatus 1*a*, it follows that the newly connected manipulating device 14 has already another section to execute the specific function.

The manipulation-limiting unit 24 causes the manipulation input-receiving unit 22 to limit the acceptance of specific manipulation in a specific state where the state detecting unit 23 determines that an alternative section is available. To be concrete, this embodiment is designed such that when the state detecting unit 23 detects that the second and subsequent manipulating devices 14 have been connected, with the first manipulating device 14 already connected, the manipulation-limiting unit 24 prevents the specific function from being executed even though the special-purpose button 15 is depressed which is attached to the second and subsequent manipulating devices 14. This offers an advantage that a little child manipulating the second and subsequent manipulating devices 14 will not invoke the specific function unintentionally. Notwithstanding, it is still possible to execute the specific function because the user manipulating the first manipulating device 14 can depress the special-purpose button 15 to invoke the specific function.

In the case where the user executes the specific manipulation while the specific manipulation is limited, the manipulation-limiting unit 24 may notify the user that the manipulation is presently limited. Such notification may be realized by temporarily displaying a certain message on the screen of the display unit 16. In addition, the manipulation-limiting unit 24 may replace the foregoing notification by a massage to guide the method for entry of the specific manipulation which is being detected by the state detecting unit 23. For example, the manipulation-limiting unit 24 may display on the display unit 16 the message that specifies the manipulating device 14 which is to accept the specific manipulation.

Incidentally, in the case where the connection between the first manipulating device 14 and the information processing apparatus is cancelled, with the second and subsequent manipulating devices 14 having the specific manipulation limited, it is difficult to invoke the specific function in that state. In order to cope with this situation, the state detecting unit 23 monitors the connection between the first manipulating device 14 (from which to accept the specific manipulation) and the information processing apparatus 1*a*, so that it may cancel restrictions for the specific manipulation to the other manipulating device 14 connected thereto. Alternatively, the state detecting unit 23 may not limit the specific manipulation whenever the manipulating device 14 is newly connected but may limit the specific manipulation only when the newly connected manipulating device 14 is of specific type or of the same type as the already connected manipulating device 14.

Figure 3:
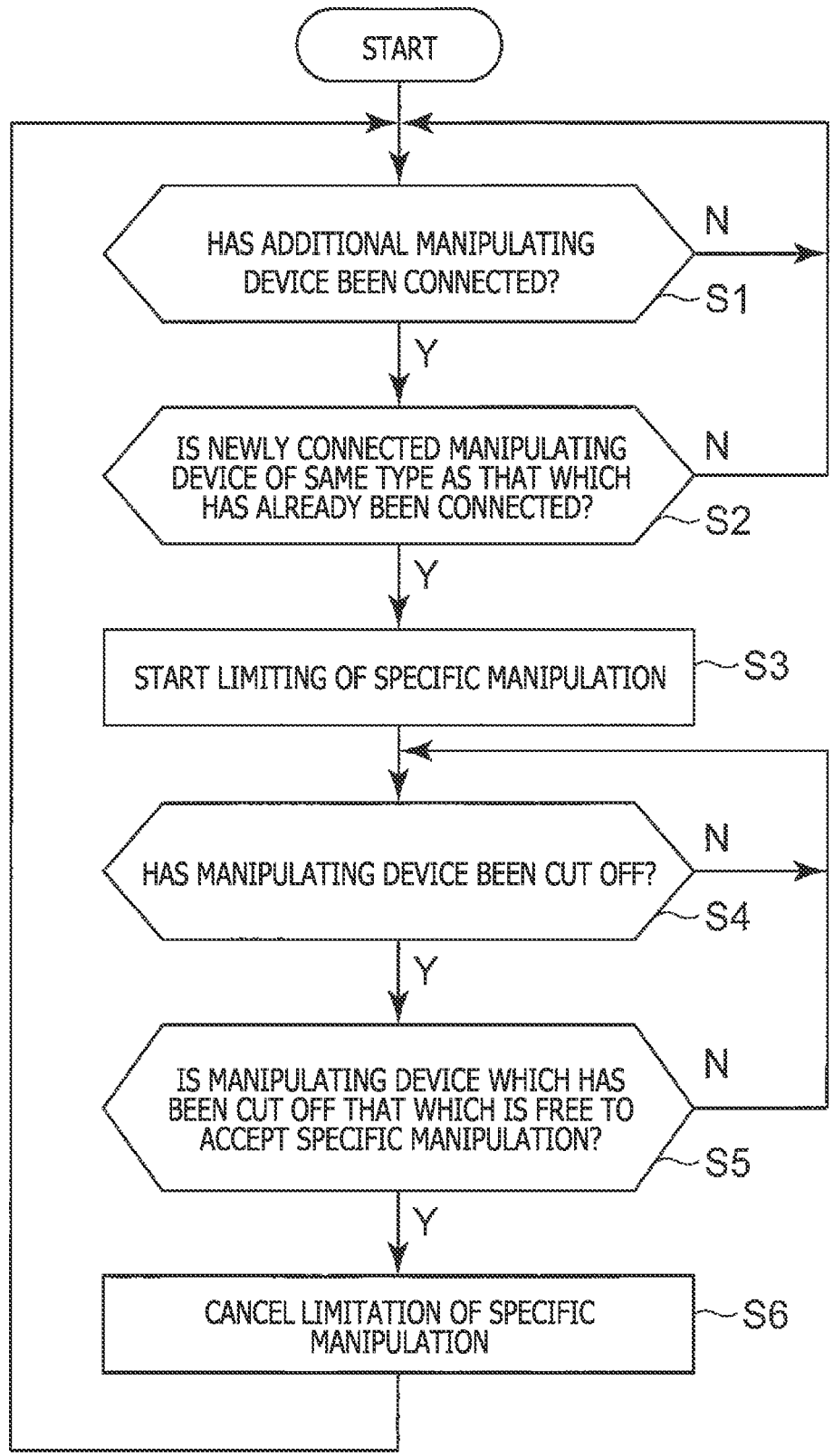
FIG. 3 is a flow diagram depicting one example of a process flow for execution by the information processing apparatus according to the first embodiment of the present disclosure.

FIG. 3 is a typical flow sheet depicting the process for the information processing apparatus 1a to perform the control as mentioned above. Assuming that the first manipulating device 14 has been connected, the state detecting unit 23 monitors the connection of an additional manipulating device 14 (S1). Whenever the connection is detected, the state detecting unit 23 determines whether or not the newly connected manipulating device 14 is of the same type as the manipulating device 14 which has already been connected (S2). In the exemplified case, the manipulation-limiting unit 24 does not limit the specific manipulation unless the newly connected manipulating device 14 is the same one as that already connected, and the step returns to S1. On the other hand, if the newly connected manipulating device 14 is the same one as that already connected, the manipulation-limiting unit 24 starts limiting the specific manipulation for the newly connected manipulating device 14 (S3).

Subsequently, the state detecting unit 23 monitors whether or not the manipulating device 14 has been cut off (S4). In the case where the manipulating device 14 has been cut off, the state detecting unit 23 determines whether or not the manipulating device 14 which has been cut off is that which has been connected first (or which is free to accept the specific manipulation) (S5). In the case where the manipulating device 14 to accept the specific manipulation has been cut off, the manipulation-limiting unit 24 cancels the limitation of specific manipulation which has been applied to the other manipulating device 14 (S6). In the case where the limitation on the specific manipulation is cancelled, the state detecting unit 23 returns to S1 and continues to monitor the state of connection of the manipulating device 14.

As mentioned above, the information processing apparatus 1a pertaining to this embodiment imposes limitations on the specific manipulation in response to how the manipulating device 14 is connected. This makes it easy to limit the specific manipulation.

The foregoing description is based on the assumption that the manipulation-limiting unit 24 starts its function to limit the specific manipulation when the manipulation device 14 is newly connected. However, this assumption is not necessarily essential, and the limitation of the specific manipulation may take place on any other occasions. In an example of such occasions, the state detecting unit 23 will accept the user's instruction to start the limitation of the specific manipulation and the manipulation-limiting unit 24 starts limiting the specific manipulation in response to such an instruction. In this case there is a possibility of disabling the execution of the specific function if the reception of the instruction for the specific manipulation from the manipulating device 14 is limited according to the user's instruction. This situation is circumvented by causing the state detecting unit 23 to accept from the individual manipulating devices 14 the instruction to limit the entry for the specific manipulation by other manipulating devices 14.

A typical example is given below in which it is assumed that the information processing apparatus 1a has first and second manipulating devices 14a and 14b connected thereto. It is also assumed in this example that when the state detecting unit 23 accepts an instruction to limit the entry of the specific manipulation from the first manipulating device 14a, the manipulation-limiting unit 24 does not allow the first manipulating device 14a (which has received the instruction) to limit the entry of the specific manipulation but allows the second manipulating device 14b to limit the entry of the specific manipulation. This permits the user to enter the order for the specific manipulation from the first manipulation device 14a even though the specific manipulation is being limited. Incidentally, in the case where there does not exist any other manipulating device 14 when the user's order to limit the specific manipulation is accepted, it follows that there does not exist any alternative section to execute the specific functions, and hence the manipulation-limiting unit 24 will not perform the step of limiting the specific manipulation. In this case, too, the manipulation-limiting unit 24 may cancel the limitation of the specific manipulation when connection is canceled for the first manipulating device 14a which is to accept the specific manipulation.

Second Embodiment

The following covers the second embodiment for an information processing apparatus 1b. The information processing apparatus 1a according to the first embodiment mentioned above is succeeded in its basic structure and functions to the information processing apparatus 1b except that they differ from each other in the method of accepting the user's entry for manipulation. Thus, the second embodiment employs the same codes as those used in the first embodiment to denote the constituents for the functions similar to those in the first embodiment, with their detailed description omitted.

The information processing apparatus 1b according to the second embodiment may be a smartphone or tablet, for example, and the manipulating device 14 accepts the user's entry for manipulation corresponding to the manipulation objects depicted on the display unit 16. Thus, the user executes the manipulation input into the information processing apparatus 1b by bringing his/her finger or a stylus held in his/her hand to any appropriate position on the display or by taking any action to indicate an arbitrary position.

An example of the manipulating device 14 that permits the user to enter the input for manipulation may be a touch sensor arranged over the plane of the display unit 16. In this case, the manipulating device 14 and the display unit 16 may be constructed integrally with the information processing apparatus 1b. Moreover, the display unit 16 may be a projector that displays a video on the wall or floor as a screen. In this case, the manipulating device 14 may be an object sensor (like an infrared sensor) to detect the position of an object, such as the user's finger on the projection screen. The manipulating device 14 mentioned above permits the user to manipulate intuitively any object that appears on the display screen.

According to this embodiment, the manipulation input-receiving unit 22 may accept the order for the specific manipulation which includes selecting the manipulation object displayed on the specific display region on the screen of the display unit 16. Moreover, the manipulation input-receiving unit 22 may accept the user's gesture (such as the movement of his/her finger on the display screen) so that the manipulating object is displayed on the screen as part of the specific manipulation.

Figure 4:
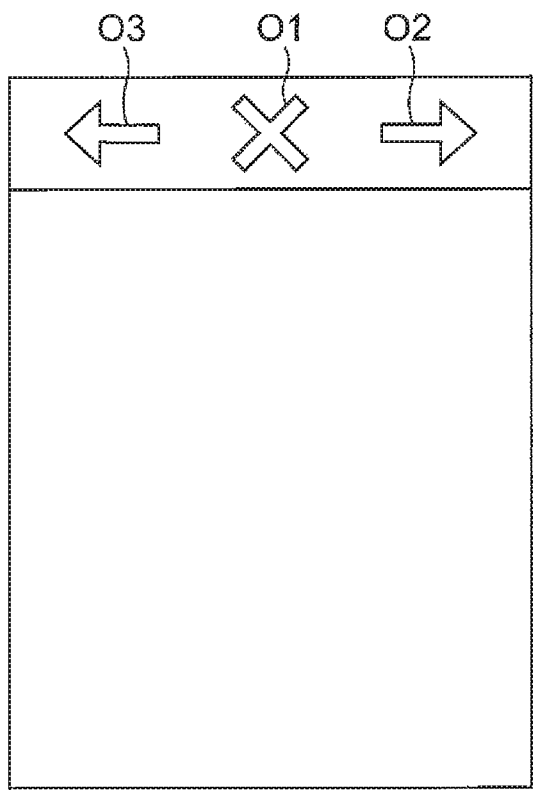
FIG. 4 is a diagram depicting a screen displayed by the information processing apparatus according to a second embodiment of the present disclosure.

Depicted in FIG. 4 is an example of the display depicting the manipulating object for the specific manipulation. The illustrated example includes three manipulating objects arranged along the upper side of the screen, with each mark indicating the specific function. In other words, a manipulation object O1 depicted at the center corresponds to the specific function to terminate the application program in progress. Also, manipulation objects O2 and O3 at the right and left ends of the upper side of the screen cause the displayed image to move forward or backward one step, respectively. These manipulation objects are displayed at a specific position on the screen when the user swipes his/her finger downward in the neighborhood of the upper side of the screen. In this way, the user can terminate the application program in progress or move the screen image of the application program backward one step or invoke a specific application program by means of a preset operation.

In this embodiment, too, the state detecting unit 23 monitors whether or not the manipulating device 14 has been newly connected to the information processing apparatus 1b, and it informs the manipulation-limiting unit 24 that the manipulating device 14 has been newly connected, apart from the manipulating device 14 corresponding to the display unit 16 that is displaying the image of the current application program.

In the case where the state detecting unit 23 detects that the manipulating device 14 (capable of performing specific manipulations) has been newly connected, the manipulation-limiting unit 24 limits the acceptance of the specific manipulation by the manipulating device 14 which has already been connected. The second embodiment differs from the first embodiment in that the procedure is reversed. That is, when the manipulating device 14 is newly connected, it limits the reception of the specific manipulation from the existing manipulating device 14. However, the second embodiment may work in the same way as the first embodiment; in other words, it may limit the function of the manipulating device 14 which has been newly connected.

The foregoing procedure makes it impossible for the user to perform the specific manipulation through the manipulating device 14 which has been in use when another manipulating device 14 is connected. This prevents the user from executing the specific function inadvertently due to misoperation. Moreover, since the manipulation input-receiving unit 22 is able to accept the specific manipulation through the newly connected manipulating device 14, there is no possibility of becoming completely unable to execute the specific function.

In addition, the manipulation-limiting unit 24 may have a separate manipulating section that permits the user to instruct the execution of the specific function when it starts limiting the specific manipulation. This is accomplished by allocating the operation to instruct the specific function to the operation which is more difficult to execute than the specific manipulation as the object of limitation and which is not used frequently. An example of such alternative operation is the operation of the power source button. In general, the power source button is used to stop or restart the information processing apparatus 1b. When this power source button is depressed by the user, the manipulation-limiting unit 24 not only suspends the power supply but also executes the specific function or causes the screen to display a manipulation object to indicate it.

Figure 5:
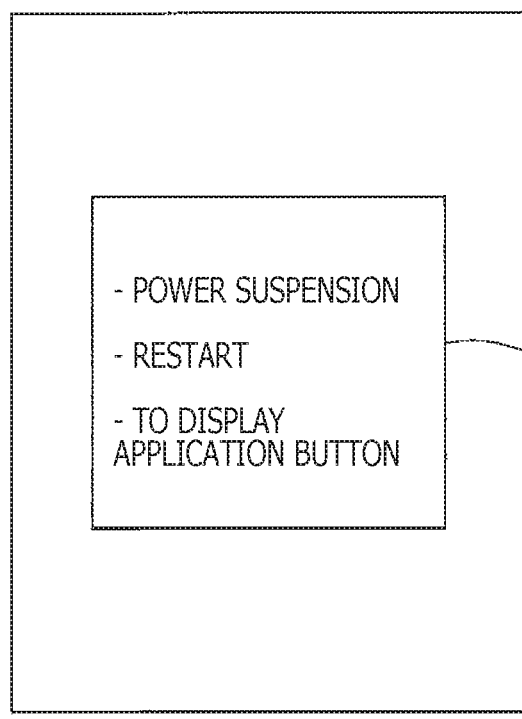
FIG. 5 is another diagram depicting the screen displayed by the information processing apparatus according to the second embodiment of the present disclosure.

An example of such screen images is depicted in FIG. 5. It represents a menu M which appears when the user depresses the power source button. The menu M includes "Power suspension," "Restart," and "To display application button." The menu item "To display application button" appears only when the manipulation-limiting unit 24 is limiting the specific manipulation. If this menu item is selected by the user, the manipulation object (or the application button) as depicted in FIG. 4 appears which has been hidden. The user selects this manipulation object to become able to execute the specific manipulation even in the situation in which the specific manipulation is being limited.

As mentioned above, the second embodiment works in the same way as the first embodiment to easily make the information processing apparatus 1b have the specific manipulation limited.

The embodiments of the present disclosure are not restricted to those mentioned above. The foregoing is based on the assumption that the information processing apparatus is a desktop game machine or a smartphone; however, it further includes a portable game machine, tablet, personal computer, and the like. The control to be executed by the information processing apparatus 1a will be executed also by the information processing apparatus 1b, and vice versa.

Moreover, the foregoing does not restrict the specific function (independent of the application program) and the specific manipulation to execute the specific function. The information processing apparatus according to the embodiments of the present disclosure may execute the various functions independent of the application program which are restricted in response to the presence of alternative section.

In addition, the foregoing description is not intended to restrict the condition to limit the acceptance of the specific manipulation, but it can be applied to various conditions. For example, the manipulation-limiting unit 24 may limit accepting the specific manipulation only while it is executing the application program of specific type. Conversely, the manipulation-limiting unit 24 may suspend the limitation of accepting the specific manipulation while it is executing the application program of specific type even though there exists a situation in which the acceptance of the specific manipulation is limited.

The present disclosure contains subject matter related to that disclosed in Japanese Priority Patent Application JP 2017-222797 filed in the Japan Patent Office on Nov. 20, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method for controlling an information processing, said method comprising:
  detecting connection of a first manipulating device from a plurality of manipulating devices;
  accepting from the first manipulating device a specific manipulation for instructing to execute a specific function independent of an application program; and
  selectively enabling or disabling acceptance of the specific manipulation from a second manipulating device from the plurality of manipulating devices connected concurrently with the first manipulating device through operation of the first manipulating device by a user.

2. The method of claim 1, further comprising:
  limiting the acceptance of the specific manipulation from a third manipulating device of the plurality of manipulating devices if the first manipulating device is concurrently connected.

3. The method of claim 1, further comprising:
  informing the user that the acceptance of specific manipulation is limited on the second manipulating device in the case where said specific manipulation is performed while the acceptance of said specific manipulation is limited on the second manipulating device.

4. A non-transitory compute readable medium having stored thereon a program for a computer, causing the computer to execute steps comprising:
- detecting connection of a first manipulating device from a plurality of manipulating devices;
- accepting from the first manipulating device a specific manipulation for instructing to execute a specific function independent of an application program; and
- selectively enabling or disabling acceptance of the specific manipulation from a second manipulating device from the plurality of manipulating devices connected concurrently with the first manipulating device through operation of the first manipulating device by a user.

\* \* \* \* \*